(12) United States Patent
Yang et al.

(10) Patent No.: US 10,470,182 B2
(45) Date of Patent: Nov. 5, 2019

(54) VEHICULAR COMMUNICATION METHOD AND SYSTEM

(71) Applicant: Harman International Industries, Incorporated, Stamford, CT (US)

(72) Inventors: Zeng Yang, Shanghai (CN); Qingshan Zhang, Shanghai (CN); Guoxia Zhang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 373 days.

(21) Appl. No.: 14/907,548

(22) PCT Filed: Aug. 20, 2013

(86) PCT No.: PCT/CN2013/081852
§ 371 (c)(1),
(2) Date: Jan. 25, 2016

(87) PCT Pub. No.: WO2015/024185
PCT Pub. Date: Feb. 26, 2015

(65) Prior Publication Data
US 2016/0198466 A1     Jul. 7, 2016

(51) Int. Cl.
*H04L 12/28* (2006.01)
*H04W 72/04* (2009.01)
(Continued)

(52) U.S. Cl.
CPC ......... *H04W 72/0453* (2013.01); *H04L 67/12* (2013.01); *H04W 4/06* (2013.01);
(Continued)

(58) Field of Classification Search
CPC ..... H04W 16/14; H04W 72/02; H04W 8/005; H04W 28/18; H04W 72/0453;
(Continued)

(56) References Cited

U.S. PATENT DOCUMENTS

2010/0296404 A1   11/2010   Quadri et al.
2011/0111713 A1   5/2011    Park et al.
(Continued)

FOREIGN PATENT DOCUMENTS

CN          1881852 A       12/2006

OTHER PUBLICATIONS

International Search Report dated May 7, 2014 in Application No. PCT/CN2013/08852.

(Continued)

*Primary Examiner* — Noel R Beharry
*Assistant Examiner* — Lionel Preval
(74) *Attorney, Agent, or Firm* — Artegis Law Group, LLP

(57) ABSTRACT

One embodiment of the present disclosure sets forth a technique for enabling vehicular communication. The technique includes broadcasting, from a first communication device of a first vehicle and in a dedicated vehicular communication channel, a service advertisement message indicating that a service is available and can be provided through a temporary communication channel which is determined to be available. The technique further includes receiving from a second communication device of a second vehicle a request for the service in the dedicated vehicular communication channel. The technique further includes transmitting, in response to the request, content of the service in the temporary communication channel to the second communication device.

10 Claims, 4 Drawing Sheets

(51) Int. Cl.
*H04W 4/06* (2009.01)
*H04L 29/08* (2006.01)
*H04W 8/18* (2009.01)
*H04W 36/26* (2009.01)
*G08G 1/0967* (2006.01)
*H04W 84/18* (2009.01)

(52) U.S. Cl.
CPC ........... *H04W 8/183* (2013.01); *H04W 36/26* (2013.01); *G08G 1/096791* (2013.01); *H04W 84/18* (2013.01)

(58) Field of Classification Search
CPC . H04W 74/0816; H04W 4/046; H04W 72/04; H04W 72/121; H04W 76/023; H04W 4/02; H04W 74/0808; H04W 72/0458; H04W 4/06; H04W 8/183; H04W 36/26; H04W 84/18; H04L 47/14; H04L 67/12; G08G 1/161; G08G 1/096791
See application file for complete search history.

(56) References Cited

U.S. PATENT DOCUMENTS

| | | | |
|---|---|---|---|
| 2011/0141970 A1* | 6/2011 | Juan | H04W 36/06 370/328 |
| 2012/0088511 A1 | 4/2012 | Cheng et al. | |
| 2012/0093091 A1* | 4/2012 | Kang | H04W 4/90 370/329 |
| 2012/0165056 A1* | 6/2012 | Kim | H04W 16/14 455/509 |
| 2013/0196632 A1* | 8/2013 | Horn | H04W 12/06 455/411 |
| 2015/0148054 A1* | 5/2015 | Futaki | H04W 16/14 455/454 |
| 2015/0296411 A1* | 10/2015 | Meyer | G08G 1/0112 370/336 |

OTHER PUBLICATIONS

Extended European Search Report for Application No. 13891668.9 dated Mar. 6, 2017, 6 pages.

* cited by examiner

VEHICULAR COMMUNICATION METHOD AND SYSTEM

CROSS-REFERENCE TO RELATED APPLICATIONS

The present application is a national stage application of the international application titled, "VEHICULAR COMMUNICATION METHOD AND SYSTEM," filed on Aug. 20, 2013 and having application number PCT/CN2013/081852. The subject matter of this related application is hereby incorporated herein by reference.

TECHNICAL FIELD

The present disclosure generally relates to inter-vehicle communication, particularly inter-vehicle communication through a dedicated vehicular communication channel and a temporary communication channel.

BACKGROUND

Nowadays, a large variety of applications of Vehicular Ad Hoc Network (VANET) have been identified and implemented. Most of these applications rely on existing wireless access standards for vehicular communication, such as the Wireless Access in Vehicular Environments (WAVE) and 802.11p. More recently, a new class of high bandwidth applications are being developed, such as public safety communication service, multimedia enabled driver assistance service, car-to-car video streaming service, etc. A more effective vehicular communication method for vehicular communication is needed.

SUMMARY

In one embodiment, a vehicular communication method is provided. The method may include: a first communication device of a first vehicle, which is within a vehicular communication network, broadcasting in a dedicated vehicular communication channel a service advertisement message indicating that a service is available and can be provided through a temporary communication channel which is determined available; the first communication device receiving from a second communication device of a second vehicle, which is within the vehicular communication network, a request for the service in the dedicated vehicular communication channel; and the first communication device transmitting, in response to the request, content of the service in the temporary communication channel to the second communication device.

In some embodiments, the temporary communication channel may be identified by spectrum sensing, collaborative spectrum sensing or on-line database accessing.

In some embodiments, the method may further include: the first communication device receiving a capability identifier indicating that at least one vehicle supports cognitive radio.

In some embodiments, the method may further include: checking availability of the temporary communication channel in quiet periods during which vehicles in the vehicular communication network do not transmit in the temporary communication channel; if the temporary communication channel is determined to be available after being checked in a quiet period, a renewal message indicating that the content of the service can still be transmitted in the temporary communication channel is generated and transmitted in the dedicated vehicular communication channel; if, after being checked in a quiet period, the temporary communication channel is determined to be no longer available and a first new temporary communication channel is identified, a first handover message indicating to transmit the content of the service in the first new temporary communication channel is generated and transmitted in the dedicated vehicular communication channel; if, after being checked in a quiet period, the temporary communication channel is determined to be no longer available and no new temporary communication channel is identified, an evacuation message indicating to suspend transmission of the content of the service is generated and transmitted in the dedicated vehicular communication channel; if, within a suspension period, a second new temporary communication channel is identified, a second handover message indicating to transmit the content of the service in the second new temporary communication channel is generated and transmitted in the dedicated vehicular communication channel.

In one embodiment, a vehicular communication method is provided. The method may include: a first communication device of a first vehicle, which is within a vehicular communication network, receiving in a dedicated vehicular communication channel a service advertisement message from a second communication device of a second vehicle, the service advertisement message indicating that a service is available and can be provided through a temporary communication channel which is determined available; the first communication device transmitting a request for the service to the second communication device in the dedicated vehicular communication channel; and the first communication device receiving content of the service in the temporary communication channel from the second communication device.

In some embodiments, the temporary communication channel may be identified by spectrum sensing, collaborative spectrum sensing or on-line database accessing.

In some embodiments, the method may further include: the first communication device transmitting a capability identifier indicating that the first communication device supports cognitive radio.

In some embodiments, the method may further include: checking availability of the temporary communication channel in quiet periods during which vehicles in the vehicular communication network do not transmit in the temporary communication channel; if the temporary communication channel is determined to be available after being checked in a quiet period, a renewal message indicating that the content of the service can still be transmitted in the temporary communication channel is generated and transmitted in the dedicated vehicular communication channel; if, after being checked in a quiet period, the temporary communication channel is determined to be no longer available and a first new temporary communication channel is identified, a first handover message indicating to transmit the content of the service in the first new temporary communication channel is generated and transmitted in the dedicated vehicular communication channel; if, after being checked in a quiet period, the temporary communication channel is determined to be no longer available and no new temporary communication channel is identified, an evacuation message indicating to suspend transmission of the content of the service is generated and transmitted in the dedicated vehicular communication channel; if, within a suspension period, a second new temporary communication channel is identified, a second handover message indicating to transmit the content of the service in the second new temporary communication channel is generated and transmitted in the dedicated vehicular communication channel.

In one embodiment, a vehicular communication system is provided. The system may include: a transceiver and a processing device configured to: control the transceiver to broadcast in a dedicated vehicular communication channel a service advertisement message indicating that a service is available and can be provided through a temporary communication channel which is determined available; control the transceiver to receive from a first communication device of a first vehicle a request for the service in the dedicated vehicular communication channel; and control the transceiver to transmit, in response to the request, content of the service in the temporary communication channel to the first communication device.

In some embodiments, the temporary communication channel may be identified by spectrum sensing, collaborative spectrum sensing or on-line database accessing.

In some embodiments, the processing device may be further configured to control the transceiver to receive a capability identifier indicating that at least one vehicle supports cognitive radio.

In some embodiments, the processing device may be further configured to check availability of the temporary communication channel in quiet periods during which vehicles in the vehicular communication network do not transmit in the temporary communication channel; if the processing device determines the temporary communication channel to be available after the temporary communication channel is checked in a quiet period, the processing device generates a renewal message indicating that the content of the service can still be transmitted in the temporary communication channel and controls the transceiver to transmit the renewal message in the dedicated vehicular communication channel; if, after the temporary communication channel is checked in a quiet period, the processing device determines the temporary communication channel to be no longer available and a first new temporary communication channel is identified, the processing device generates a first handover message indicating to transmit the content of the service in the first new temporary communication channel and controls the transceiver to transmit the first handover message in the dedicated vehicular communication channel; if, after the temporary communication channel is checked in a quiet period, the processing device determines the temporary communication channel to be no longer available and no new temporary communication channel is identified, the processing device generates an evacuation message indicating to suspend transmission of the content of the service and controls the transceiver to transmit the evacuation message in the dedicated vehicular communication channel; if, within a suspension period, a second new temporary communication channel is identified, the processing device generates a second handover message indicating to transmit the content of the service in the second new temporary communication channel and controls the transceiver to transmit the second handover message in the dedicated vehicular communication channel.

In one embodiment, a vehicular communication system is provided. The system may include: a transceiver and a processing device configured to: control the transceiver to receive in a dedicated vehicular communication channel a service advertisement message from a first communication device of a first vehicle, the service advertisement message indicating that a service is available and can be provided through a temporary communication channel which is determined available; control the transceiver to transmit a request for the service to the first communication device in the dedicated vehicular communication channel; and control the transceiver to receive content of the service in the temporary communication channel from the first communication device.

In some embodiments, the temporary communication channel may be identified by spectrum sensing, collaborative spectrum sensing or on-line database accessing.

In some embodiments, the processing device may be further configured to control the transceiver to transmit a capability identifier indicating that cognitive radio is supported.

In some embodiments, the processing device may be further configured to check availability of the temporary communication channel in quiet periods during which vehicles in the vehicular communication network do not transmit in the temporary communication channel; if the processing device determines the temporary communication channel to be available after the temporary communication channel is checked in a quiet period, the processing device generates a renewal message indicating that the content of the service can still be transmitted in the temporary communication channel and controls the transceiver to transmit the renewal message in the dedicated vehicular communication channel; if, after the temporary communication channel is checked in a quiet period, the processing device determines the temporary communication channel to be no longer available and a first new temporary communication channel is identified, the processing device generates a first handover message indicating to transmit the content of the service in the first new temporary communication channel and controls the transceiver to transmit the first handover message in the dedicated vehicular communication channel; if, after the temporary communication channel is checked in a quiet period, the processing device determines the temporary communication channel to be no longer available and no new temporary communication channel is identified, the processing device generates an evacuation message indicating to suspend transmission of the content of the service and controls the transceiver to transmit the evacuation message in the dedicated vehicular communication channel; if, within a suspension period, a second new temporary communication channel is identified, the processing device generates a second handover message indicating to transmit the content of the service in the second new temporary communication channel and controls the transceiver to transmit the second handover message in the dedicated vehicular communication channel.

In one embodiment, a vehicular communication system is provided. The system may include: means for broadcasting in a dedicated vehicular communication channel a service advertisement message indicating that a service is available and can be provided through a temporary communication channel which is determined available; means for receiving from a first communication device of a first vehicle a request for the service in the dedicated vehicular communication channel; and means for transmitting, in response to the request, content of the service in the temporary communication channel to the first communication device.

In one embodiment, a vehicular communication system is provided. The system may include: means for receiving in a dedicated vehicular communication channel a service advertisement message from a first communication device of a first vehicle, the service advertisement message indicating that a service is available and can be provided through a temporary communication channel which is determined available; means for transmitting a request for the service to the first communication device in the dedicated vehicular communication channel; and means for receiving content of the service in the temporary communication channel from the first communication device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
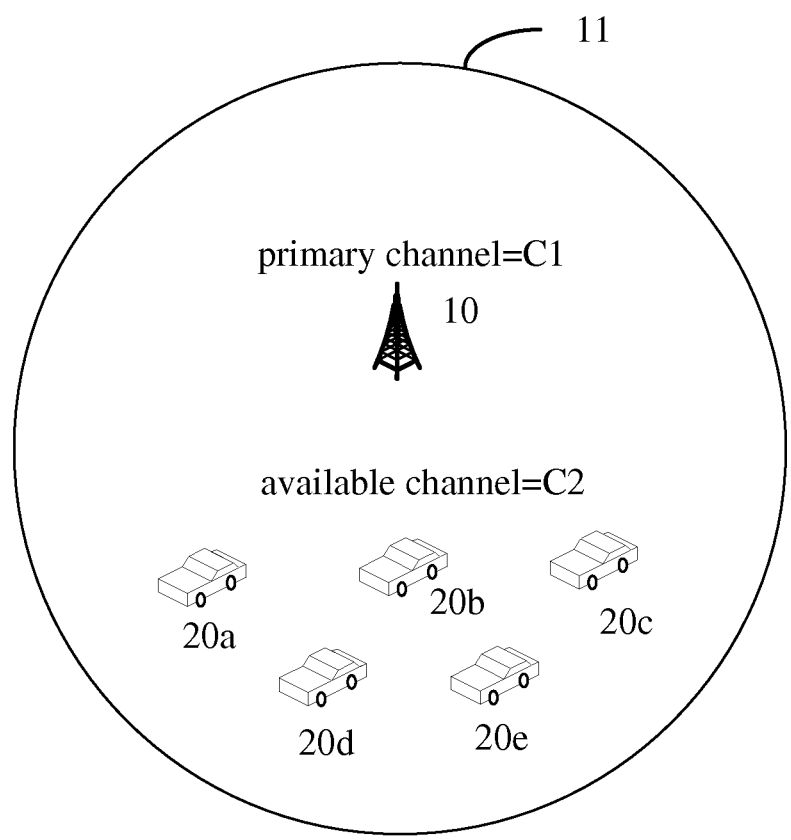
FIG. 1 schematically illustrates a cognitive radio vehicular communication network according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

It should be noted that, the terms "first", "second", and the like in the description and in the claims, are used for distinguishing between similar elements and not tend to describe a particular sequential and chronological order.

FIG. 1 schematically illustrates a cognitive radio vehicular communication network according to one embodiment.

Referring to FIG. 1, there are a plurality of vehicles (vehicle 20a, vehicle 20b, vehicle 20c, vehicle 20d and vehicle 20e) within a vehicular communication network. The vehicular communication network may be a Vehicular Ad Hoc Network (VANET). The plurality of vehicles are within a coverage 11 of a primary transmitter 10, such as a Digital Television (DTV) tower. The primary transmitter 10 uses a primary channel C1 to transmit. So the plurality of vehicles may utilize an available channel C2 to communication with each other in a cognitive radio way. Therefore, the bandwidth shortage of the existing wireless band for vehicular communication may be relieved.

Figure 2:
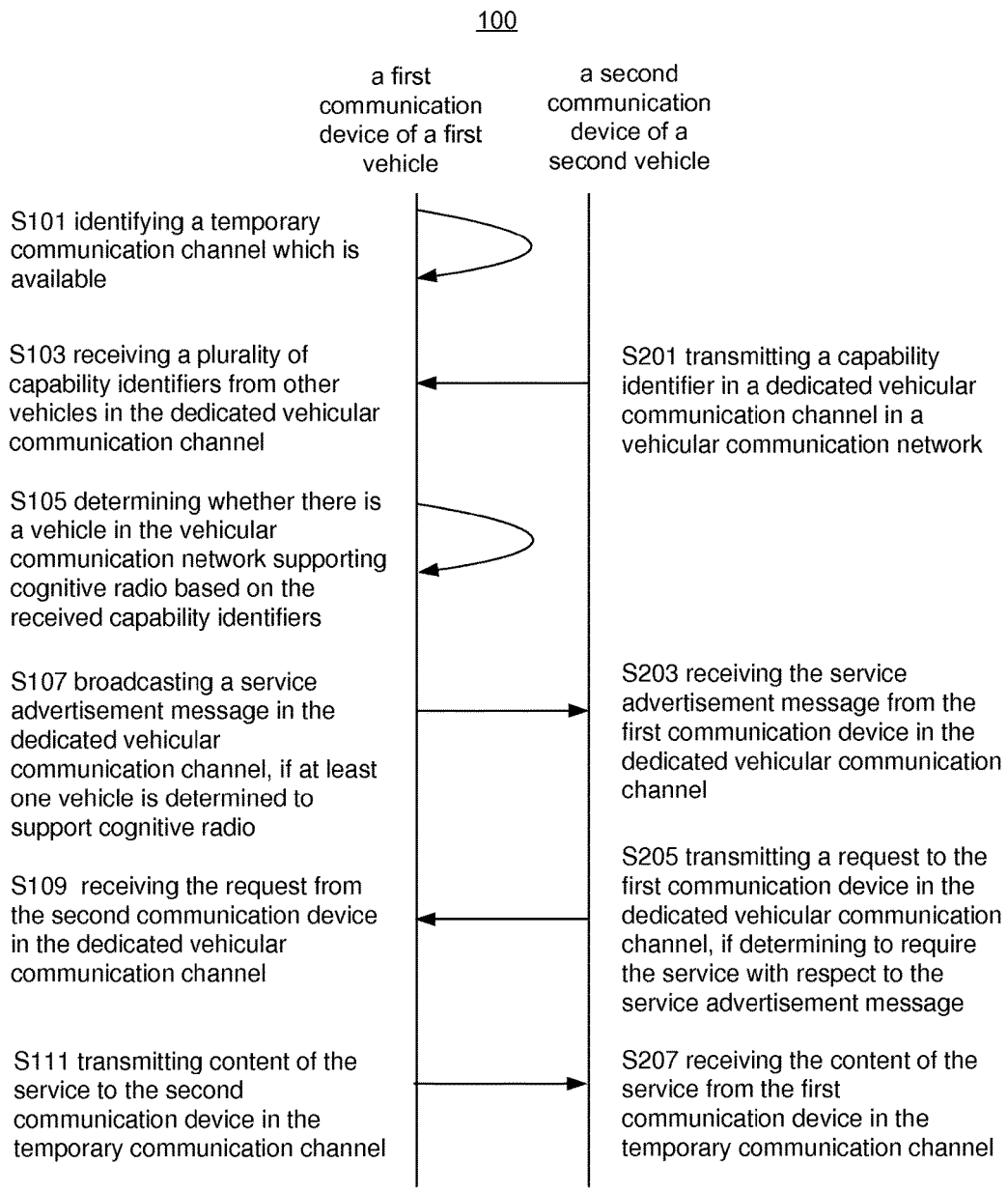
FIG. 2 illustrates a schematic flow chart of a vehicular communication method according to one embodiment.

FIG. 2 illustrates a schematic flow chart of a vehicular communication method 100 according to one embodiment.

Referring to FIG. 2, in S101, a first communication device of a first vehicle identifies a temporary communication channel which is available.

In some embodiments, the first communication device may access an on-line database which contains information of whether a channel is available, to identify an available channel as the temporary communication channel. In some embodiments, the first communication device may perform spectrum sensing to identify an available channel as the temporary communication channel. In some embodiment, the first communication device may perform collaborative spectrum sensing with other vehicles in the vicinity to identify an available channel as the temporary communication channel. The on-line database accessing, the spectrum sensing and the collaborative spectrum sensing are well known to those skilled in the art, and are not described in detail herein.

In S201, a second communication device of a second vehicle transmits a capability identifier in a dedicated vehicular communication channel in a vehicular communication network.

In some embodiments, the second communication device may transmit the capability identifier in the vehicular communication network to indicate whether the second communication device supports cognitive radio. The capability identifier may be transmitted in the dedicated vehicular communication channel based on the standards of Wireless Access in Vehicular Environments (WAVE) and 802.11p. The capability identifier may be contained in a periodic beacon exchanged between vehicles. For example, the capability identifier is contained in a Basic Safety Message (BSM) for proactive safety applications. Based on the frequency of the periodic beacon, the capability identifier may not be needed in every beacon. For example, the BSM may be transmitted ten times per second according to the WAVE standard, and the capability identifier may be contained in one of every five BSMs.

In some embodiments, the capability identifier may be as simple as a single bit piggybacked in the BSM indicating whether the vehicle supports cognitive radio. In some embodiments, the capability identifier may further include other information to indicate more capabilities.

In S103, the first communication device receives a plurality of capability identifiers from other vehicles in the dedicated vehicular communication channel.

In S105, the first communication device determines whether there is a vehicle in the vehicular communication network supporting cognitive radio based on the received capability identifiers.

In S107, the first communication device broadcasts a service advertisement message in the dedicated vehicular communication channel, if at least one vehicle within the vehicular communication network is determined to support cognitive radio.

The service advertisement message is to inform vehicles within the vehicular communication network a service is available and can be provided through the temporary communication channel which is determined available. The service may be above-mentioned high band applications, such as public safety communication service, multimedia enable driver assistance service, car-to-car video streaming service, etc. In some embodiments, the service advertisement message may be a WSA (WAVE Service Advertisement) transmitted in the dedicated vehicular communication channel, such as WAVE Control Channel (CCH). In some embodiments, the service advertisement message may include information of the temporary communication channel through which content of the service is provided. In some embodiments, the service advertisement message may further include other information of the properties of the service, for example, including information of content of the service and the service expiration time.

It should be noted that, if no vehicle within the vehicular communication network is determined to support cognitive radio, the first communication device may not broadcast the service advertisement message in the dedicated vehicular communication channel.

In S203, the second communication device receives the service advertisement message from the first communication device in the dedicated vehicular communication channel.

In S205, the second communication device transmits a request to the first communication device in the dedicated vehicular communication channel, if the second communication device determines to require the service with respect to the service advertisement message.

In some embodiments, after receiving the service advertisement message, the second communication device determines whether it needs the service. For example, the second communication device may compare information of the service content with interest tags preset in applications to determine automatically. The second communication device may transmit the request in the dedicated vehicular communication channel, such as WAVE CCH.

It should be noted that the second communication device may or may not transmit a reject message indicating it doesn't need the service.

In S109, the first communication device receives the request from the second communication device in the dedicated vehicular communication channel.

In S111, the first communication device transmits content of the service to the second communication device in the temporary communication channel.

In some embodiments, the service is a public safety communication service, and the content of the service may be a picture of traffic situation around the first vehicle. In some embodiments, the service is a car-to-car video streaming service, and the content of the service may be a video file.

In S207, the second communication device receives the content of the service from the first communication device in the temporary communication channel.

It should be noted that, in the process of transmission of the content of the service, the first communication device and the second communication device may check availability of the temporary communication channel in quiet periods. During the quiet periods, vehicles in the vehicular communication network do not transmit in the temporary communication channel. The quiet period may be established and broadcasted by any vehicles supporting cognitive radio in the vehicular communication network. The quiet period may be contained in a periodic beacon exchanged between vehicles. For example, the quiet period may be piggybacked in the BSM which is transmitted in the dedicated vehicular communication channel. Also, the quiet period may not be contained in every BSM based on the frequency of the BSM. If the temporary communication channel is determined no longer available, the first communication device or the second communication device may determine whether to evacuate the transmission of the content of the service.

Figure 3:
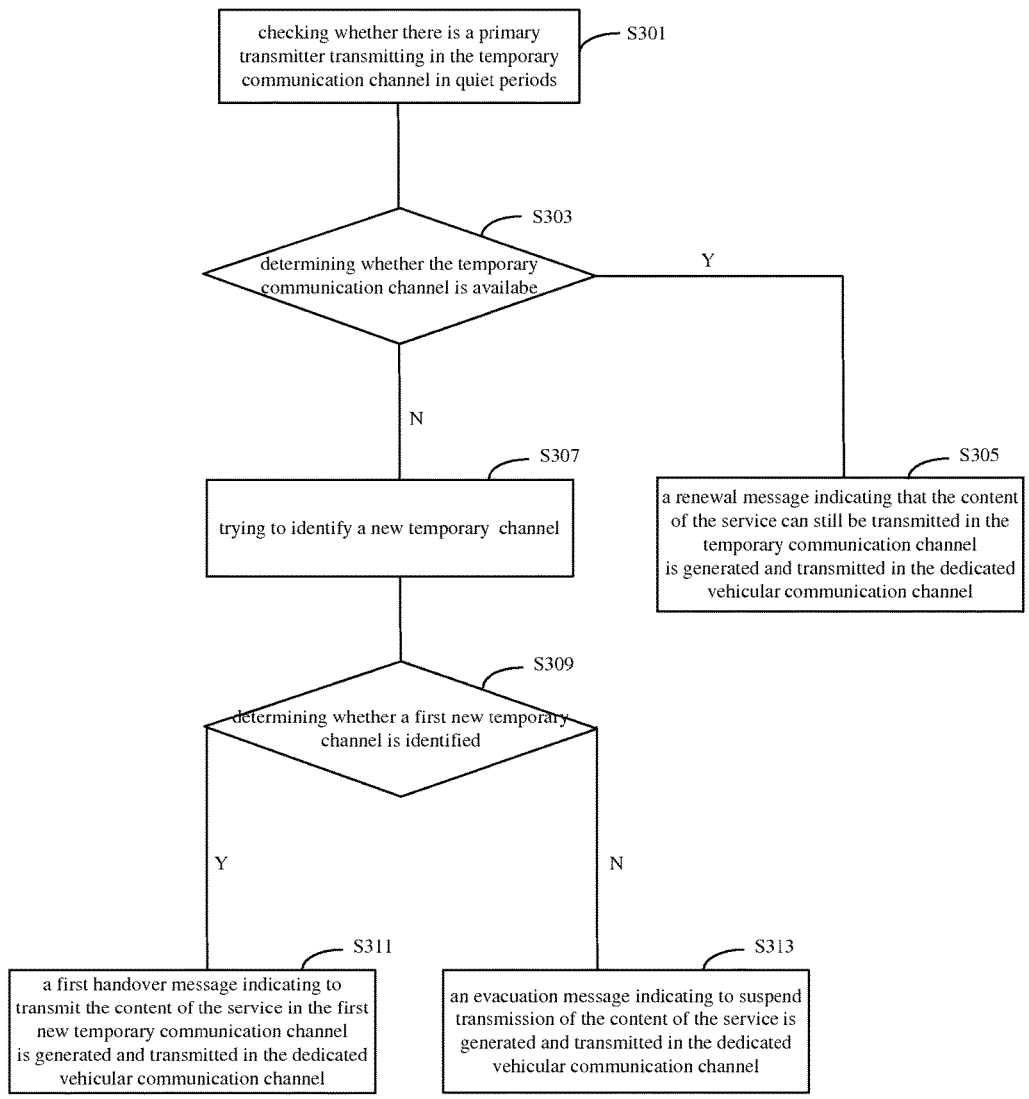
FIG. 3 illustrates a schematic flow chart of a channel availability checking method according to one embodiment.

FIG. 3 illustrates a schematic flow chart of a channel availability checking method 300 in quiet periods according to one embodiment.

In S301, check whether there is a primary transmitter transmitting in the temporary communication channel in quiet periods.

In some embodiments, the one-line database may be accessed to check whether there is a primary transmitter transmitting in the temporary communication channel. In some embodiments, the temporary communication channel may be sensed to check whether there is a primary transmitter transmitting in the temporary communication channel.

In S303, determine whether the temporary communication channel is still available.

If the checking result in S301 reveals that there is not a primary transmitter transmitting in the temporary communication channel, the temporary communication channel is determined to be available, and the method 300 goes to S305. If the checking result in S301 reveals that there is a primary transmitter transmitting in the temporary communication channel, the temporary communication channel is determined to be no longer available, and the method 300 goes to S307.

In S305, a renewal message indicating that the content of the service can still be transmitted in the temporary communication channel is generated and transmitted in the dedicated vehicular communication channel.

In some embodiments, the renewal message may include information of the service, the temporary communication channel in which the content of the service is transmitted, and the service expiration time. The renewal message may be transmitted in the dedicated vehicular communication channel, such as WAVE CCH.

In S307, try to identify a new temporary communication channel.

After the temporary communication channel is determined to be no longer available, a new temporary communication channel should be identified by on-line data accessing, spectrum sensing or collaborative spectrum sensing to transmit the content of the service.

In S309, determine whether a first new temporary communication channel is identified. If yes, the method 300 goes to S311. Otherwise, the method 300 goes to S313.

In S311, a first handover message indicating to transmit the content of the service in the first new temporary communication channel is generated and transmitted in the dedicated vehicular communication channel.

In some embodiments, the first handover message may include information of the service, the first new temporary communication channel, the service expiration time and a first handover command indicating to transmit the content of the service in the first new temporary communication channel. After reception of the first handover message, the connection between the first communication device and the second communication device may be handoff from the temporary communication channel to the first new temporary communication channel. The first handover message may be transmitted in the dedicated vehicular communication channel, such as WAVE CCH.

In S313, an evacuation message indicating to suspend transmission of the content of the service is generated and transmitted in the dedicated vehicular communication channel.

In some embodiments, the evacuation message may include information of the service, the temporary communication channel, an evacuation command indicating to suspend transmission of the content of the service and a suspension period. The evacuation message may be transmitted in the dedicated vehicular communication channel, such as WAVE CCH.

Within the suspension period, if a second new temporary communication channel is identified, a second handover message indicating to transmit the content of the service in the second new temporary communication channel may be generated and transmitted in the dedicated vehicular communication channel. The second handover message may include information of the service, the second new temporary communication channel, the service expiration time and a second handover command indicating to transmit the content of the service in the second new temporary communication channel.

It should be noted that, if no temporary communication channel is identified within the suspension period, the transmission of the content of the service should be stopped. Further, it should be noted that the first communication device and the second communication device both can perform S301-313.

As described above, the service advertisement message, the renewal message, the first handover message, the evacuation message, the second handover message and other management messages are transmitted in the dedicated vehicular communication channel. The content of the service is transmitted in the temporary communication channel which is determined available. The dedicated vehicular communication channel is more reliable and mature, while the temporary communication channel is a little more susceptible to interference from intermittent primary transmitters and other coexisting transmitters. By classifying transmission in the dedicated vehicular communication channel or the temporary communication channel according to type of the messages, the management messages which carry security information may be ensured to be well received.

According to one embodiment of the present disclosure, a vehicular communication system is provided. The system may be mounted on a vehicle.

Figure 4:
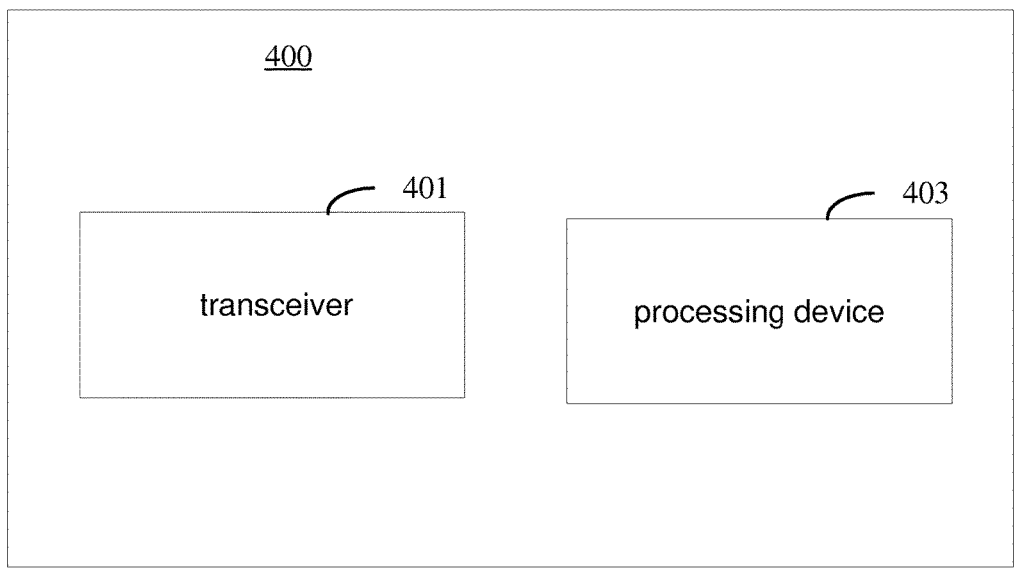
FIG. 4 schematically illustrates a vehicular communication system according to one embodiment.

Referring to FIG. 4, the system 400 may include a transceiver 401 and a processing device 403.

The transceiver 401 may be controlled to transmit or receive management messages of a service in a dedicated vehicular communication channel, and to transmit or receive content of the service in a temporary communication channel which is determined available. In some embodiments, the transceiver 401 may be a network card. By controlling the transceiver 401, the processing device 403 may be configured to perform S101-S111 of the method 100, to perform S201-207 of the method 100, or to perform S301-S315 of the method 300. In some embodiments, the processing device 403 may be a CPU, a GPU, a DSP etc, or any combination thereof.

By using method and system according to embodiments of the disclosure, the bandwidth shortage problem in vehicular communication network can be relieved and the reliability of vehicular communication is guaranteed.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A vehicular communication method, comprising:
    broadcasting from a first communication device of a first vehicle and in a dedicated vehicular communication channel a service advertisement message indicating that a service is available and can be provided through a temporary communication channel which is determined to be available;
    receiving from a second communication device of a second vehicle a request for the service in the dedicated vehicular communication channel;
    transmitting, in response to the request, content of the service in the temporary communication channel to the second communication device;
    checking availability of the temporary communication channel in quiet periods during which vehicles in a vehicular communication network do not transmit in the temporary communication channel;
    if the temporary communication channel is determined to be available after being checked in a quiet period, generating a renewal message indicating that the content of the service can still be transmitted in the temporary communication channel and transmitting the renewal message in the dedicated vehicular communication channel;
    if, after being checked in a quiet period, the temporary communication channel is determined to be no longer available and a first new temporary communication channel is identified, generating a first handover message indicating to transmit the content of the service in the first new temporary communication channel and transmitting the first handover message in the dedicated vehicular communication channel;
    if, after being checked in a quiet period, the temporary communication channel is determined to be no longer available and no new temporary communication channel is identified, generating an evacuation message indicating to suspend transmission of the content of the service and transmitting the evacuation message in the dedicated vehicular communication channel; and
    if, within a suspension period, a second new temporary communication channel is identified, generating a second handover message indicating to transmit the content of the service in the second new temporary communication channel and transmitting the second handover message in the dedicated vehicular communication channel.

2. The method according to claim 1, further comprising identifying the temporary communication channel by spectrum sensing, collaborative spectrum sensing or on-line database accessing.

3. A vehicular communication method, comprising:
    receiving at a first vehicle and via a dedicated vehicular communication channel a service advertisement message from a second vehicle, the service advertisement message indicating that a service is available and can be provided through a temporary communication channel which is determined to be available;
    transmitting a request for the service to the second vehicle via the dedicated vehicular communication channel;
    receiving from the second vehicle content of the service via the temporary communication channel;
    checking availability of the temporary communication channel in quiet periods during which vehicles in a vehicular communication network do not transmit in the temporary communication channel;

if the temporary communication channel is determined to be available after being checked in a quiet period, generating a renewal message indicating that the content of the service can still be transmitted in the temporary communication channel and transmitting the renewal message in the dedicated vehicular communication channel;

if, after being checked in a quiet period, the temporary communication channel is determined to be no longer available and a first new temporary communication channel is identified, generating a first handover message indicating to transmit the content of the service in the first new temporary communication channel and transmitting the first handover message in the dedicated vehicular communication channel;

if, after being checked in a quiet period, the temporary communication channel is determined to be no longer available and no new temporary communication channel is identified, generating an evacuation message indicating to suspend transmission of the content of the service and transmitting the evacuation message in the dedicated vehicular communication channel; and if, within a suspension period, a second new temporary communication channel is identified, generating a second handover message indicating to transmit the content of the service in the second new temporary communication channel and transmitting the second handover message in the dedicated vehicular communication channel.

4. The method according to claim 3, further comprising identifying the temporary communication channel by spectrum sensing, collaborative spectrum sensing or on-line database accessing.

5. A vehicular communication system, comprising:
a transceiver; and
a processing device configured to:
control the transceiver to broadcast in a dedicated vehicular communication channel a service advertisement message indicating that a service is available and can be provided through a temporary communication channel which is determined to be available;
control the transceiver to receive from a first communication device of a first vehicle a request for the service in the dedicated vehicular communication channel;
control the transceiver to transmit, in response to the request, content of the service in the temporary communication channel to the first communication device;
check availability of the temporary communication channel in quiet periods during which vehicles in a vehicular communication network do not transmit in the temporary communication channel;
if the processing device determines the temporary communication channel to be available after the temporary communication channel is checked during a quiet period, generate a renewal message indicating that the content of the service can still be transmitted in the temporary communication channel and control the transceiver to transmit the renewal message in the dedicated vehicular communication channel;
if, after the temporary communication channel is checked during a quiet period, the processing device determines the temporary communication channel to be no longer available and a first new temporary communication channel is identified, generate a first handover message indicating to transmit the content of the service in the first new temporary communication channel and control the transceiver to transmit the first handover message in the dedicated vehicular communication channel;
if, after the temporary communication channel is checked during a quiet period, the processing device determines the temporary communication channel to be no longer available and no new temporary communication channel is identified, generate an evacuation message indicating to suspend transmission of the content of the service and control the transceiver to transmit the evacuation message in the dedicated vehicular communication channel; and
if, within a suspension period, a second new temporary communication channel is identified, generate a second handover message indicating to transmit the content of the service in the second new temporary communication channel and control the transceiver to transmit the second handover message in the dedicated vehicular communication channel.

6. The system according to claim 5, wherein the temporary communication channel is identified by spectrum sensing, collaborative spectrum sensing or on-line database accessing.

7. A vehicular communication system, comprising:
a transceiver; and
a processing device configured to:
control the transceiver to receive in a dedicated vehicular communication channel a service advertisement message from a first communication device of a first vehicle, the service advertisement message indicating that a service is available and can be provided through a temporary communication channel which is determined to be available;
control the transceiver to transmit a request for the service to the first communication device in the dedicated vehicular communication channel;
control the transceiver to receive content of the service in the temporary communication channel from the first communication device;
check availability of the temporary communication channel in quiet periods during which vehicles in a vehicular communication network do not transmit in the temporary communication channel;
if the processing device determines the temporary communication channel to be available after the temporary communication channel is checked during a quiet period, generate a renewal message indicating that the content of the service can still be transmitted in the temporary communication channel and control the transceiver to transmit the renewal message in the dedicated vehicular communication channel;
if, after the temporary communication channel is checked during a quiet period, the processing device determines the temporary communication channel to be no longer available and a first new temporary communication channel is identified, generate a first handover message indicating to transmit the content of the service in the first new temporary communication channel and control the transceiver to transmit the first handover message in the dedicated vehicular communication channel;
if, after the temporary communication channel is checked during a quiet period, the processing device determines the temporary communication channel to be no longer available and no new temporary communication channel is identified, generate an evacuation message indicating to suspend transmission of the content of the service and control the transceiver to transmit the evacuation message in the dedicated vehicular communication channel; and if, within a suspension period, a second new temporary communication channel is identified, generate a second handover message indicating to transmit the content of the service in the second new temporary communication channel and control the transceiver to transmit the second handover message in the dedicated vehicular communication channel.

8. The system according to 7, wherein the temporary communication channel is identified by spectrum sensing, collaborative spectrum sensing or on-line database accessing.

9. A vehicular communication system, comprising:

means for broadcasting in a dedicated vehicular communication channel a service advertisement message indicating that a service is available and can be provided through a temporary communication channel which is determined to be available;

means for receiving from a first communication device of a first vehicle a request for the service in the dedicated vehicular communication channel;

means for transmitting, in response to the request, content of the service in the temporary communication channel to the first communication device;

means for checking availability of the temporary communication channel in quiet periods during which vehicles in a vehicular communication network do not transmit in the temporary communication channel;

if the temporary communication channel is determined to be available after being checked in a quiet period, means for generating a renewal message indicating that the content of the service can still be transmitted in the temporary communication channel and means for transmitting the renewal message in the dedicated vehicular communication channel;

if, after being checked in a quiet period, the temporary communication channel is determined to be no longer available and a first new temporary communication channel is identified, means for generating a first handover message indicating to transmit the content of the service in the first new temporary communication channel and means for transmitting the first handover message in the dedicated vehicular communication channel;

if, after being checked in a quiet period, the temporary communication channel is determined to be no longer available and no new temporary communication channel is identified, means for generating an evacuation message indicating to suspend transmission of the content of the service and means for transmitting the evacuation message in the dedicated vehicular communication channel; and if, within a suspension period, a second new temporary communication channel is identified, means for generating a second handover message indicating to transmit the content of the service in the second new temporary communication channel and means for transmitting the second handover message in the dedicated vehicular communication channel.

10. A vehicular communication system, comprising:

means for receiving in a dedicated vehicular communication channel a service advertisement message from a first communication device of a first vehicle, the service advertisement message indicating that a service is available and can be provided through a temporary communication channel which is determined to be available;

means for transmitting a request for the service to the first communication device in the dedicated vehicular communication channel;

means for receiving content of the service in the temporary communication channel from the first communication device;

means for checking availability of the temporary communication channel in quiet periods during which vehicles in a vehicular communication network do not transmit in the temporary communication channel;

if the temporary communication channel is determined to be available after being checked in a quiet period, means for generating a renewal message indicating that the content of the service can still be transmitted in the temporary communication channel and means for transmitting the renewal message in the dedicated vehicular communication channel;

if, after being checked in a quiet period, the temporary communication channel is determined to be no longer available and a first new temporary communication channel is identified, means for generating a first handover message indicating to transmit the content of the service in the first new temporary communication channel and means for transmitting the first handover message in the dedicated vehicular communication channel;

if, after being checked in a quiet period, the temporary communication channel is determined to be no longer available and no new temporary communication channel is identified, means for generating an evacuation message indicating to suspend transmission of the content of the service and means for transmitting the evacuation message in the dedicated vehicular communication channel; and if, within a suspension period, a second new temporary communication channel is identified, means for generating a second handover message indicating to transmit the content of the service in the second new temporary communication channel and means for transmitting the second handover message in the dedicated vehicular communication channel.

* * * * *